(12) United States Patent
Saito (10) Patent No.: US 8,405,894 B2
(45) Date of Patent: Mar. 26, 2013

(54) LIGHT AMOUNT ADJUSTMENT APPARATUS HAVING PLURALITY OF PLATE-LIKE LIGHT-SHIELDING BLADE MEMBERS AND METHOD OF MANUFACTURING THE LIGHT-SHIELDING BLADE MEMBERS

(75) Inventor: Junichi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 12/874,733

(22) Filed: Sep. 2, 2010

(65) Prior Publication Data

US 2011/0058242 A1 Mar. 10, 2011

(30) Foreign Application Priority Data

Sep. 8, 2009 (JP) .................................. 2009-206845

(51) Int. Cl.
*G02B 26/02* (2006.01)
(52) U.S. Cl. ........ 359/227; 359/233; 359/234; 359/236; 396/461; 396/493; 264/1.36
(58) Field of Classification Search .................. 359/227, 359/233, 234, 236; 396/461, 493, 495–497, 396/510; 264/1.36, 162, 232, 238
See application file for complete search history.

(56) References Cited

U.S. PATENT DOCUMENTS

| 5,025,278 | A  | * | 6/1991 | Matsubara | ..................... | 396/452 |
| 5,731,016 | A  | * | 3/1998 | Imanari et al. | ................ | 425/571 |
| 6,858,959 | B2 | * | 2/2005 | Aoshima | .................. | 310/156.32 |
| 7,290,947 | B2 | * | 11/2007 | Naganuma | ..................... | 396/453 |
| 7,699,546 | B2 | * | 4/2010 | Osoniwa et al. | ............. | 396/510 |
| 7,907,321 | B2 | * | 3/2011 | Mizumaki et al. | ............ | 359/234 |
| 8,184,354 | B2 | * | 5/2012 | Mizumaki et al. | ............ | 359/227 |
| 2010/0195182 | A1 | * | 8/2010 | Kawamoto | .................... | 359/234 |

FOREIGN PATENT DOCUMENTS

| JP | 2002-229095 | 8/2002 |
| JP | 2006-084658 | 3/2006 |

* cited by examiner

*Primary Examiner* — Frank Font
(74) *Attorney, Agent, or Firm* — Cowan, Liebowitz & Latman, P.C.

(57) ABSTRACT

A light amount adjustment apparatus having a plurality of light-shielding blade members that can be so manufactured by simple machining as to reduce undesired reflection on end faces of the light-shielding blade members which are parallel with the optical axis and prevent degradation in image quality such as flare and ghosts. A driving force of a stepping motor is transmitted to the light-shielding blade members so that an aperture diameter can be changed. The light-shielding blade members are formed by injection molding of a light-shielding resin material. By performing blasting on an end face of each light-shielding blade member in a part that forms the aperture diameter, an aperture end face whose surface is roughened while substantially maintaining outside dimensions of the light-shielding blade member is formed, and an oblique portion tilted relative to the aperture end face is formed.

8 Claims, 6 Drawing Sheets

SECTION A-A

FIG.4A

SECTION A-A

FIG.4B

SECTION A-A

SECTION A-A

FIG.8A

SECTION A-A

FIG.8B

SECTION A-A

LIGHT AMOUNT ADJUSTMENT APPARATUS HAVING PLURALITY OF PLATE-LIKE LIGHT-SHIELDING BLADE MEMBERS AND METHOD OF MANUFACTURING THE LIGHT-SHIELDING BLADE MEMBERS

BACKGROUND OF THE INVENTION

1. Field of the Invention

The present invention relates to a light amount adjustment apparatus for use in an image pickup apparatus, and in particular to a light amount adjustment apparatus having a plurality of plate-like light-shielding blade members and a method of manufacturing the light-shielding blade members.

2. Description of the Related Art

Generally, there are image pickup apparatuses such as digital cameras which use a diaphragm unit having light-shielding blade members mounted thereon. It is known that, like other members in an image pickup lens, when the light-shielding blade members cause undesired internal reflection, this results in degradation in image quality such as flare and ghosts. For this reason, surfaces of the light-shielding blade members are coated with a coating for light absorption so as to prevent degradation in image quality.

Also, it is known that in a diaphragm unit having light-shielding blade members, degradation in image quality such as ghosts occurs due to reflection on end faces of the light-shielding blade members which form an aperture and are parallel with an optical axis. For this reason, the end faces of the light-shielding blade members are also coated with a coating for light absorption, or the end faces of the light-shielding blade members are formed into complicated shapes so as to prevent degradation in image quality.

For example, there has been proposed a means for making end faces of light-shielding blade members which form an aperture thin-walled to a sufficient degree by injection molding so as to prevent internal reflection on the end faces (see, for example, Japanese Laid-Open Patent Publication (Kokai) No. 2006-84658).

Also, there has been proposed a means for forming end faces of light-shielding blade members which form an aperture in a stepwise or steplessly curved pattern to make the end faces of the light-shielding blade members thin-walled to the extent possible so that regions causing harmful back reflection in the end faces of the light-shielding blade members which form the aperture and are parallel with the optical axis can be reduced so as to reduce degradation in image quality such as flare and ghosts (see, for example, Japanese Laid-Open Patent Publication (Kokai) No. 2002-229095).

However, when light-shielding blade members are formed by injection molding, it is necessary to make end faces of the light-shielding blade members thin-walled so that the end faces of the light-shielding blade members can be small. To this end, resin input pathways provided in a mold for injection molding are formed to be extremely narrow, and it is thus necessary to prevent resin from being uncharged and also prevent burrs from being formed due to excessive charge of resin. For this reason, injection molding performed so as to make end faces of light-shielding blade members thin-walled is accompanied with a difficulty in determining injection molding conditions.

Further, when light-shielding blade members are formed by injection molding, end faces of the light-shielding blade members are formed in a stepwise fine pattern comprised of a plurality of steps or steplessly curved fine pattern by injection molding. To this end, resin input pathways provided in a mold for injection molding are formed to be extremely narrow, and it is thus necessary to prevent resin from being uncharged and also prevent burrs from being formed due to excessive charge of resin. For this reason, injection molding performed to form end faces of light-shielding blade members in a stepwise fine pattern comprised of a plurality of steps or a steplessly curved fine pattern by injection molding is also accompanied with a difficulty in determining injection molding conditions.

SUMMARY OF THE INVENTION

The present invention provides a light amount adjustment apparatus having light-shielding blade members that can be so manufactured by simple machining as to reduce undesired reflection on end faces of the light-shielding blade members which are parallel with an optical axis and prevent degradation in image quality such as flare and ghosts, and a method of manufacturing the light-shielding blade members.

Accordingly, a first aspect of the present invention provides a light amount adjustment apparatus comprising a driving source, and a plurality of light-shielding blade members to which a driving force of the driving source is transmitted to change an aperture diameter, wherein the light-shielding blade members are formed by injection molding of a light-shielding resin material, and wherein by performing blasting on an end face of the light-shielding blade member in a part that forms the aperture diameter, an aperture end face whose surface is roughened while substantially maintaining outside dimensions of the light-shielding blade member is formed, and an oblique portion tilted relative to the aperture end face is formed.

Accordingly, a second aspect of the present invention provides a light amount adjustment apparatus comprising a driving source, and a plurality of light-shielding blade members to which a driving force of the driving source is transmitted to change an aperture diameter, wherein the light-shielding blade members are formed by punching a light-shielding plate material, and wherein by performing blasting on an end face of the light-shielding blade member in a part that forms the aperture diameter, an aperture end face whose surface is roughened while substantially maintaining outside dimensions of the light-shielding blade member is formed, and an oblique portion tilted relative to the aperture end face is formed.

Accordingly, a third aspect of the present invention provides a method of manufacturing a light-shielding blade member, comprising a step of performing injection molding of a light-shielding resin material, a step of fixing, on a fixing member, a light-shielding blade member formed by injection molding of the resin material in the injection molding step, and a step of performing blasting on an end face of the fixed light-shielding blade member in a part that forms an aperture diameter, wherein when fixing, on the fixing member, the light-shielding blade member formed by injection molding, the light-shielding blade member formed by injection molding is fixed on the fixing member such that the fixing member is exposed outside the part of the light-shielding blade member formed by injection molding which forms the aperture diameter.

Accordingly, a fourth aspect of the present invention provides a method of manufacturing a light-shielding blade member, comprising a step of punching a light-shielding plate material, a step of fixing, on a fixing member, a light-shielding blade member formed by punching the plate material in the pinching step, and a step of performing blasting on an end face of a part of the fixed light-shielding blade member which forms an aperture diameter, wherein when fixing, on the fixing member, the light-shielding blade member formed by punching, the light-shielding blade member formed by punching is fixed on the fixing member such that the fixing member is exposed outside the part of the light-shielding blade member formed by punching which forms the aperture diameter.

According to the present invention, there can be provided a light amount adjustment apparatus having light-shielding blade members that can be so manufactured by simple machining as to reduce undesired reflection on end faces of the light-shielding blade members which are parallel with the optical axis and prevent degradation in image quality such as flare and ghosts, and a method of manufacturing the light-shielding blade members.

Further features of the present invention will become apparent from the following description of exemplary embodiments (with reference to the attached drawings).

DESCRIPTION OF THE EMBODIMENTS

A first embodiment of the present invention will now be described with reference to FIGS. 1 to 4B.

Figure 1:
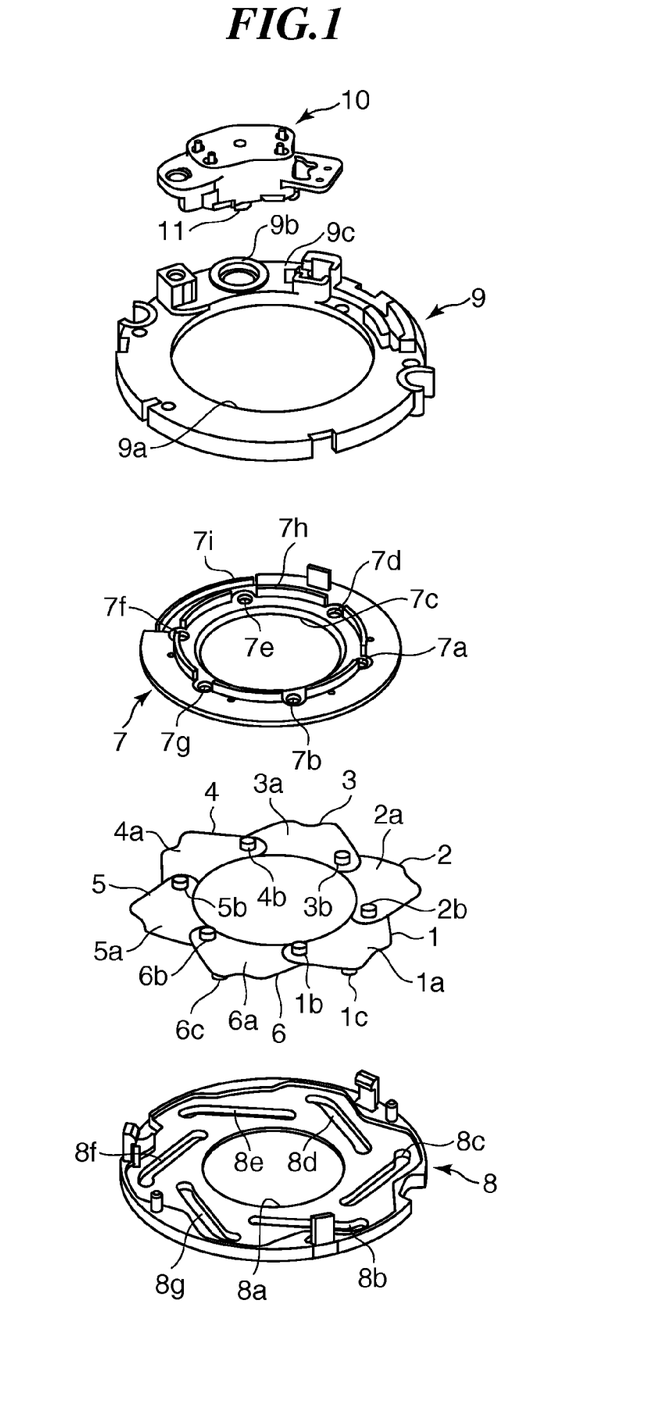
FIG. 1 is an exploded perspective view schematically showing essential constituent members of a light amount adjustment apparatus according to a first embodiment of the present invention.

FIG. 1 is an exploded perspective view schematically showing essential constituent members of a light amount adjustment apparatus according to the first embodiment.

Figure 2:
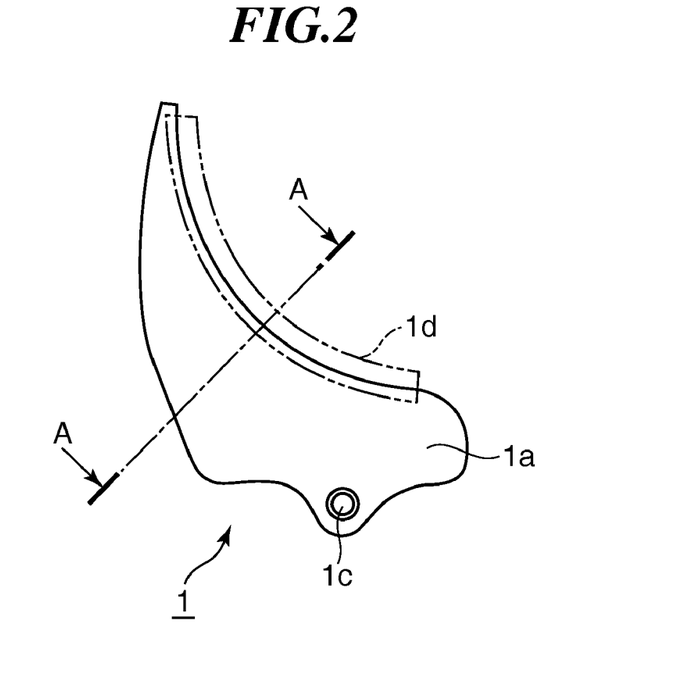
FIG. 2 is a plan view showing a light-shielding blade member for use in the light amount adjustment apparatus according to the first embodiment.

FIG. 2 is a plan view showing a light-shielding blade member for use in the light amount adjustment apparatus according to the first embodiment.

Figure 3:
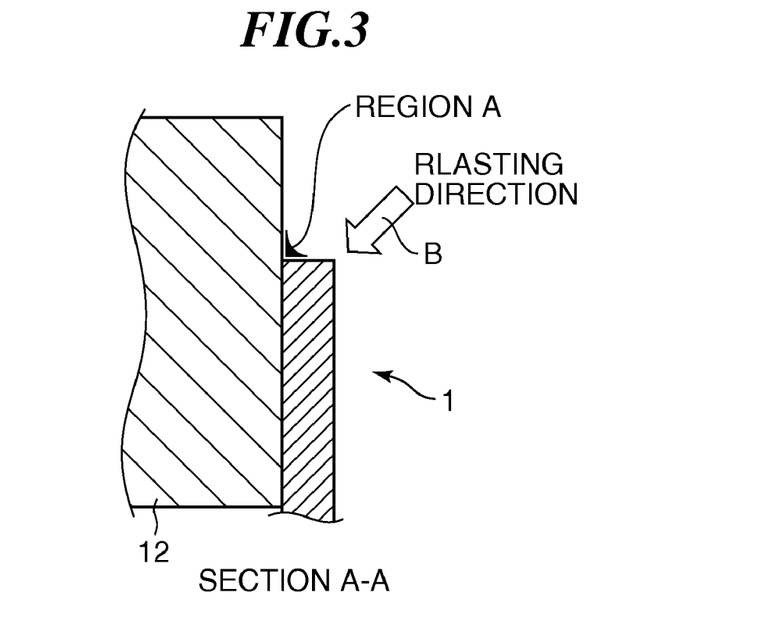
FIG. 3 is a view showing the light-shielding blade member cut along line A-A of FIG. 2 so as to explain a method of performing blasting on an end portion of the light-shielding blade member for use in the light amount adjustment apparatus according to the first embodiment.

FIG. 3 is a view showing the light-shielding blade member cut along line A-A of FIG. 2 so as to explain a method of performing blasting on an end portion of the light-shielding blade member for use in the light amount adjustment apparatus according to the first embodiment.

Figure 4A:
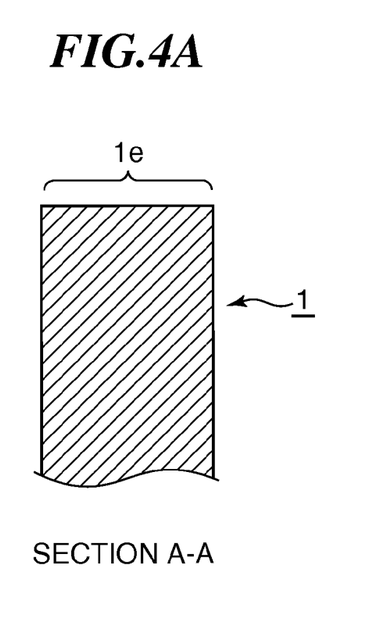
FIG. 4A is an enlarged cross-sectional view showing the end portion of the light-shielding blade member according to the first embodiment cut along line A-A of FIG. 2 in a state before blasting as post-processing.
Figure 4B:
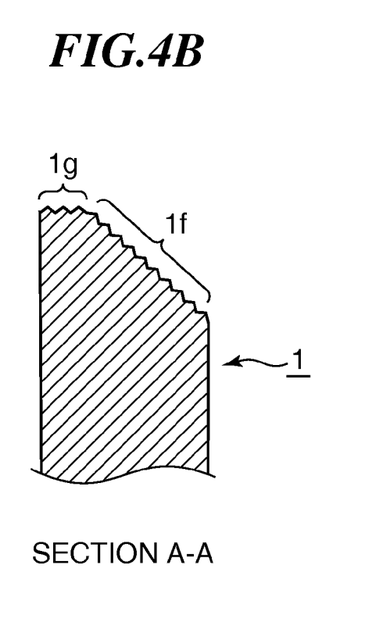
FIG. 4B is an enlarged cross-sectional view showing the end portion of the light-shielding blade member in a state after blasting.

FIG. 4A is an enlarged cross-sectional view showing the end portion of the light-shielding blade member according to the first embodiment cut along line A-A of FIG. 2 in a state before blasting as post-processing, and FIG. 4B is an enlarged cross-sectional view showing the end portion of the light-shielding blade member in a state after blasting.

In FIG. 1, reference numerals 1, 2, 3, 4, 5, and 6 designate respective ones of a plurality of light-shielding blade members provided in the light amount adjustment apparatus and having basically the same arrangements. The light-shielding blade members 1 to 6 have sheet-like light-shielding blade base portions 1a to 6a for controlling the amount of aperture. Further, the light-shielding blade members 1 to 6 have first shaft portions 1b to 6b provided on one sides of the blade base portions, and second shaft portions 1c to 6c provided on the other sides of the blade base portions (partially not shown).

Moreover, in FIG. 1, a reference numeral 7 designates a ring-shaped rotary member with an aperture 7a formed in the middle. The rotary member 7 is provided with shaft hole portions 7b, 7c, 7d, 7e, 7f, and 7g, six-parted rotation fit projecting portions 7h, and a gear portion 7i.

In FIG. 1, a reference numeral 8 designates a ring-shaped cam member with an aperture 8a formed in the middle. The cam member 8 is provided with cam groove portions 8b, 8c, 8d, 8e, 8f, and 8g.

In FIG. 1, a reference numeral 9 designates a ring-shaped pressing member with an aperture 9a formed in the middle. The pressing member 9 is provided with a hole portion 9b and a motor mounting portion 9c.

In FIG. 1, a reference numeral 10 designates a stepping motor that drives the rotary member 7. A pinion gear 11 is fixed to a distal end of a shaft of the stepping motor 10. The stepping motor 10 is mounted on the motor mounting portion 9c of the pressing member 9. The pinion gear 11 is extended out through the hole portion 9b of the pressing member 9 and engaged with the gear portion 7i of the rotary member 7.

In the light amount adjustment apparatus, the pressing member 9 is fixed to the cam member 8 with the rotary member 7 and the light-shielding blade members 1 to 6 interposed therebetween. Thus, the pressing member 9 prevents the rotary member 7 and the light-shielding blade members 1 to 6 from falling off in the direction of the optical axis.

In the light amount adjustment apparatus, the rotation fit projecting portions 7h of the rotary member 7 are fitted into and rotatably supported by the aperture 9a of the pressing member 9. The first shaft portions 1b to 6b of the light-shielding blade members 1 to 6 are rotatably supported by the respective shaft hole portions 7b to 7g of the rotary member 7. Further, the second shaft portions 1c to 6c of the light-shielding blade members 1 to 6 are slidably supported by the respective cam groove portions 8b to 8g of the cam member 8.

In the light amount adjustment apparatus, the light-shielding blade members 1 to 6 are spaced equidistantly in a circumferential direction around the optical axis. The light-shielding blade members 1 to 6 are so configured as to be capable of controlling the aperture opening amount by changing states of overlapping of the light-shielding blade base portions 1a to 6a, and the greater the amount of overlapping, the smaller the aperture opening amount.

In the light amount adjustment apparatus, by controlling the operation of the stepping motor 10, the aperture opening diameter is changed to adjust the amount of light.

Thus, in the light amount adjustment apparatus, when a control unit, not shown, drives the stepping motor 10, the pinion gear 11 rotates. In response to the rotation of the pinion gear 11, the rotary member 7 rotates to rotatively drive the first shaft portions 1b to 6b of the light-shielding blade members 1 to 6 about the optical axis.

With this operation, the second shaft portions 1c to 6c are moved along the cam groove portions 8b to 8g of the cam member 8. This operation causes the second shaft portions 1c to 6c to relatively rotate about the shaft hole portions 7b to 7g of the rotary member 7, whereby the amount of entry into the aperture 8 is changed.

The six light-shielding blade members 1 to 6 operate to change the aperture opening diameter at the same time in synchronization with the rotary member 7. In this operation in which the aperture opening diameter is changed, the aperture opening diameter is continuously changed from a retracted state in which the light-shielding blade members 1 to 6 are retracted from the aperture 8a of the cam member 8 to an inserted state in which the light-shielding blade members 1 to 6 are inserted into the aperture 8a of the cam member 8. In the above described way, in the light amount adjustment apparatus, by controlling the operation of the stepping motor 10, the aperture opening diameter is changed to adjust the amount of light.

Next, a method of manufacturing the light-shielding blade members according to the first embodiment will be described.

The light-shielding blade members 1 to 6 are formed by injection molding of a resin material in which an additive such as carbon black for making the resin material light-shielding is mixed as appropriate. In the injection molding, the first shaft portion 1b and the second shaft portion 1c appearing in FIG. 1 are formed integrally with the blade base portion 1a. For the light-shielding blade members 1 to 6 thus formed by the injection molding, blasting as post-processing is performed on a light-shielding blade member end portion 1d, which is a portion forming an aperture diameter of the light-shielding blade members 1 to 6.

It should be noted that blasting performed here is a process in which nonmetallic particles or metallic particles are caused to collide with the light-shielding blade member end portion 1d as a material to be cut so that the light-shielding blade member end portion 1d can be surface-roughened or lightly cut. Particularly in the present embodiment, blasting is performed using wet blasting. Wet blasting is a machining method that surface roughening or light cutting is performed by projecting nonmetallic particles or metallic particles using spray droplets formed by applying the pressure of compressed air or the like to a liquid such as water.

To perform blasting as post-processing on the light-shielding blade member end portion 1d of the light-shielding blade members 1 to 6, first, the light-shielding blade member 1 as a material to be cut is fixed on a plane of a fixing jig 12 such that a beam incidence plane of the light-shielding blade member 1 is faced up as shown in FIG. 3. On this occasion, the plane of the fixing jig 12 on which the light-shielding blade members 1 is fixed is exposed outside the light-shielding blade member end portion 1d of the light-shielding blade members 1. As a result, a corner part indicated as a region A in FIG. 3 is formed by a light-shielding blade end face 1e and the plane of the fixing jig 12. Blasting is then performed in which spray droplets containing nonmetallic particles or metallic particles are sprayed obliquely downward in a direction indicated by an arrow B in FIG. 3 at high pressure onto the light-shielding blade member end portion 1d so that the light-shielding blade member end portion 1d can be surface-roughened or lightly cut. Here, the direction indicated by the arrow B is a direction that is tilted at a predetermined angle from a direction perpendicular to the plane of the fixing jig 12 to a direction in which the plane of the fixing jig 12 is exposed.

In the light-shielding blade member end portion 1d of the light-shielding blade members 1 to 6 fabricated by performing blasting using wet blasting, an oblique portion 1f that has been surface-roughened and tilted relative to the optical axis is formed by machining as shown in FIG. 4B. Namely, in the light-shielding blade member end portion 1d, a light-shielding blade end face 1g as an aperture end face so formed as to be parallel with the optical axis is fabricated in a part corresponding to the inner periphery of the aperture through which light can pass. Also, in the light-shielding blade member end portion 1d, the oblique portion if which is so formed as to be extended out from the light-shielding blade end face 1g in a manner being tilted relative to the optical axis is fabricated in a part corresponding to the inner periphery of the aperture through which light can pass.

In the case where the light-shielding blade member end portion 1d is machined into the oblique portion 1f having the surface thereof roughened and tilted relative to the optical axis in the above described way, undesired light can be prevented from being reflected and causing ghosts, flare, and so on.

Moreover, the region A shown in FIG. 3 is a region that is not subjected to blasting during machining by blasting using wet blasting. Specifically, this region that is not subjected to blasting is the corner part formed by the light-shielding blade end face 1e and the plane of the fixing jig 12. This region is not subjected to blasting because the flow rate of spray droplets projecting nonmetallic particles or metallic particles is low, and the power of machining on the light-shielding blade end face 1e is low.

After undergoing blasting shown in FIG. 3, the light-shielding blade member end portion 1d has a form partially cut away by blasting as shown in FIG. 4B. Specifically, in the part of the light-shielding blade member end portion 1d which corresponds to the inner periphery of the aperture through which light can pass, the oblique portion 1f is newly formed in a range between the plane of the blade base portion 1a and the light-shielding blade end face 1e. At the same time, in the part of the light-shielding blade member end portion 1d which corresponds to the inner periphery of the aperture through which light can pass, the light-shielding blade end face 1g that is a part of the light-shielding blade end face 1e is newly formed.

The light-shielding blade end face −1g has a shape formed with low machining power resulting from a low flow rate of spray droplets in the region A in FIG. 3. The newly formed light-shielding blade end face 1g substantially maintains the outside dimensions of the blade base portion 1a. Namely, in the case where blasting is performed as shown in FIG. 3, a desired shape shown in FIG. 4B can be obtained without loss of the dimensional accuracy of the light-shielding blade member end portion 1e.

Moreover, blasting has a surface roughing effect. Thus, the oblique portion 1f formed in the part corresponding to the inner periphery of the aperture through which light can pass and the light-shielding blade end face 1g are each surface-roughened as distinct from the properties of the light-shielding blade end face 1e that was a smooth surface before blasting. It should be noted that the light-shielding blade end face 1e before blasting is also a plane that, when assembled as it is into the light amount adjustment apparatus, causes ghosts, flare, and so on because it is parallel with the optical axis and acts as a reflection surface for undesired light.

Moreover, the light-shielding blade members 2 to 6 are formed similarly to the above described light-shielding blade member 1 and incorporated into the light amount adjustment apparatus according to the first embodiment.

In the aperture formed by the light-shielding blade members 2 to 6 subjected to blasting described above, the light-shielding blade end face 1g smaller than the light-shielding blade end face 1e as a smooth surface parallel with the optical axis and having the surface thereof roughened is newly formed.

For this reason, in the aperture formed by the light-shielding blade members 1 to 6 subjected to blasting, undesired reflection on the light-shielding blade end faces which could cause degradation in image quality such as flare and ghosts can be reduced. Moreover, according to the above arrangement of the light-shielding blade members 1 to 6, there is no need to prepare molds having complicated shapes when forming the light-shielding blade members 1 to 6 by injection molding, and hence the ease of mold release can be enhanced.

Next, a second embodiment of the present invention will now be described with reference to FIGS. 5 to 8B.

Figure 5:
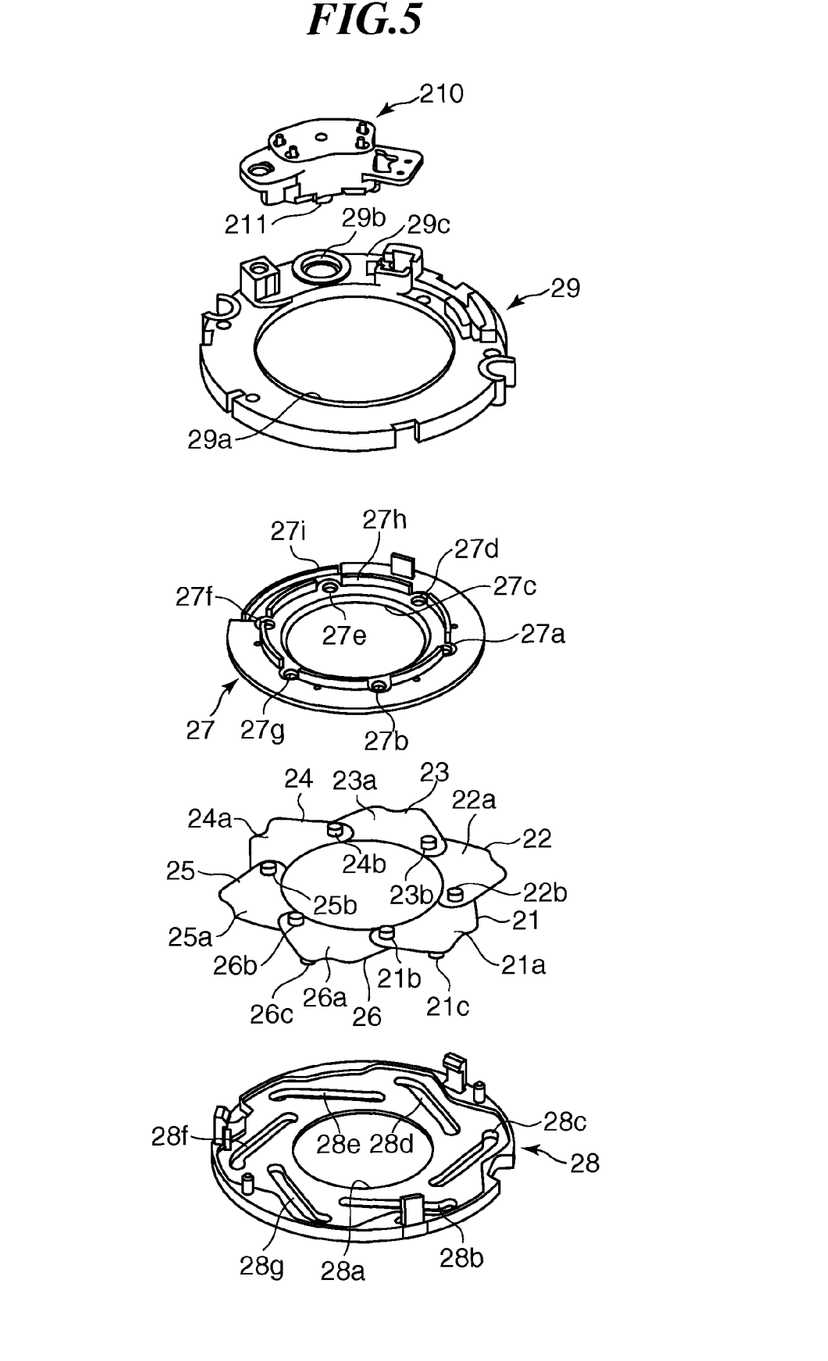
FIG. 5 is an exploded perspective view schematically showing essential constituent members of a light amount adjustment apparatus according to a second embodiment of the present invention.

FIG. 5 is an exploded perspective view schematically showing essential constituent members of a light amount adjustment apparatus according to the second embodiment.

Figure 6:
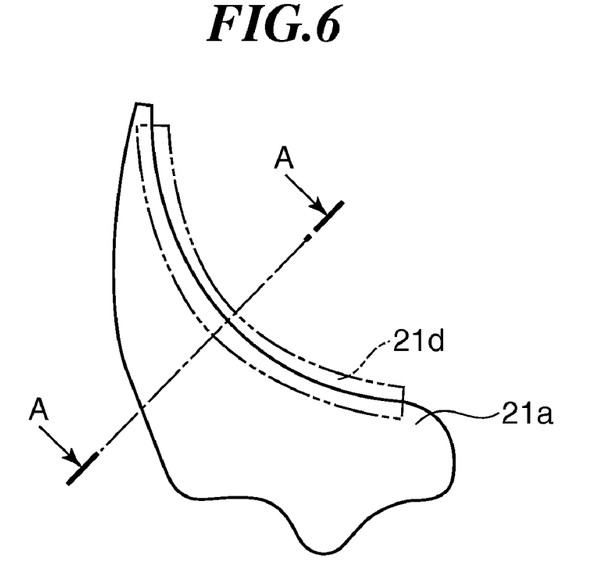
FIG. 6 is a plan view showing a light-shielding blade member for use in the light amount adjustment apparatus according to the second embodiment.

FIG. 6 is a plan view showing a light-shielding blade member for use in the light amount adjustment apparatus according to the second embodiment.

Figure 7:
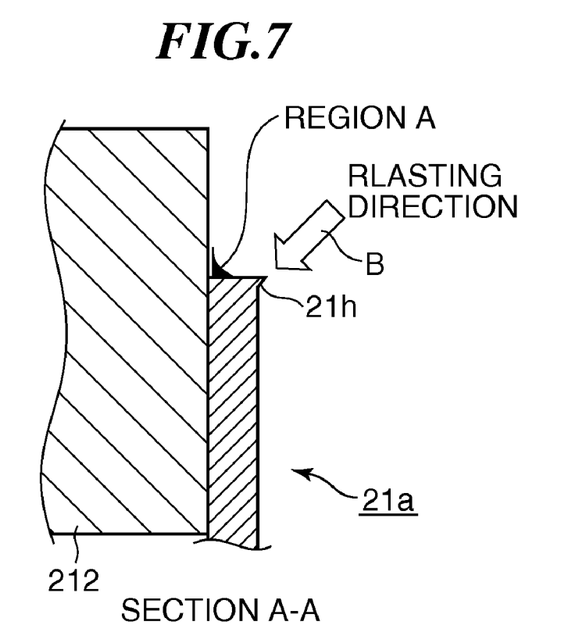
FIG. 7 is a view showing the light-shielding blade member cut along line A-A of FIG. 6 so as to explain a method of performing blasting on an end portion of the light-shielding blade member for use in the light amount adjustment apparatus according to the second embodiment.

FIG. 7 is a view showing the light-shielding blade member cut along line A-A of FIG. 6 so as to explain a method of performing blasting on an end portion of the light-shielding blade member for use in the light amount adjustment apparatus according to the second embodiment.

Figure 8A:
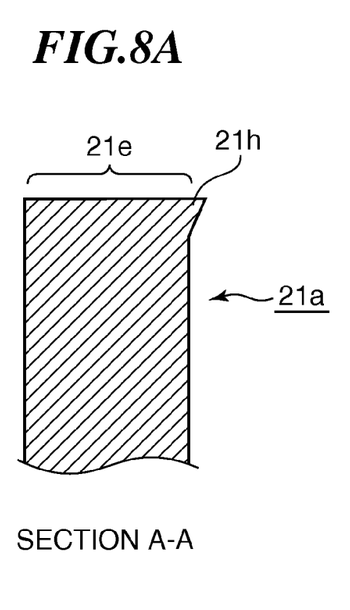
FIG. 8A is an enlarged cross-sectional view showing the end portion of the light-shielding blade member according to the second embodiment cut along line A-A of FIG. 6 in a state before blasting as post-processing.
Figure 8B:
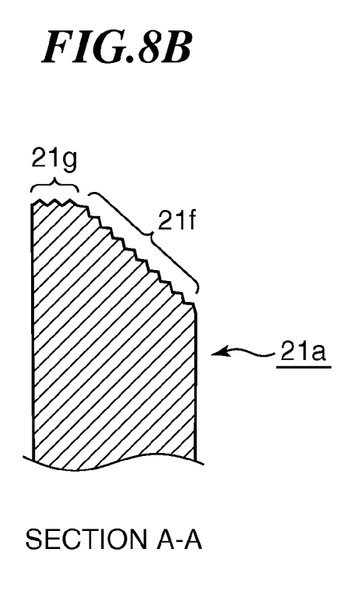
FIG. 8B is an enlarged cross-sectional view showing the end portion of the light-shielding blade member in a state after blasting.

FIG. 8A is an enlarged cross-sectional view showing the end portion of the light-shielding blade member according to the second embodiment cut along line A-A of FIG. 6 in a state before blasting as post-processing, and FIG. 8B is an enlarged cross-sectional view showing the end portion of the light-shielding blade member in a state after blasting.

In FIG. 5, reference numerals 21, 22, 23, 24, 25, and 26 designate respective ones of a plurality of light-shielding blade members provided in the light amount adjustment apparatus and having basically the same arrangements. The light-shielding blade members 21 to 26 have light-shielding blade base portions 21a to 26a for controlling the amount of aperture, which are formed into sheet shapes by punching a light-shielding plate material. Further, the light-shielding blade members 21 to 26 have first shaft portions 21b to 26b provided on one sides of the blade base portions, and second shaft portions 21c to 26c provided on the other sides of the blade base portions (partially not shown). The first shaft portions 21b to 26b and the second shaft portions 21c to 26c are formed in a separate step (for example, by outsert molding) from a step in which the blade base portion 21a is formed.

Moreover, in FIG. 5, a reference numeral 27 designates a ring-shaped rotary member with an aperture 27a formed in the middle. The rotary member 27 is provided with shaft hole portions 27b, 27c, 27d, 27e, 27f, and 27g, six-parted rotation fit projecting portions 27h, and a gear portion 27i.

In FIG. 5, a reference numeral 28 designates a ring-shaped cam member with an aperture 28a formed in the middle. The cam member 28 is provided with cam groove portions 28b, 28c, 28d, 28e, 28f, and 28g.

In FIG. 5, a reference numeral 29 designates a ring-shaped pressing member with an aperture 29a formed in the middle. The pressing member 29 is provided with a hole portion 29b and a motor mounting portion 29c.

In FIG. 5, a reference numeral 210 designates a stepping motor that drives the rotary member 27. A pinion gear 211 is fixed to a distal end of a shaft of the stepping motor 210. The stepping motor 210 is mounted on the motor mounting portion 29c of the pressing member 29.

The pinion gear 11 is extended out through the hole portion 29b of the pressing member 29 and engaged with the gear portion 27i of the rotary member 27.

In the light amount adjustment apparatus, the pressing member 29 is fixed to the cam member 28 with the rotary member 27 and the light-shielding blade members 21 to 26 interposed therebetween. Thus, the pressing member 29 prevents the rotary member 27 and the light-shielding blade members 21 to 26 from falling off in the direction of the optical axis.

In the light amount adjustment apparatus, the rotation fit projecting portions 27h of the rotary member 27 are engaged with and rotatably supported by the aperture 29a of the pressing member 29. The first shaft portions 21b to 26b of the light-shielding blade members 21 to 26 are rotatably supported by the respective shaft hole portions 27b to 27g of the rotary member 27. Further, the second shaft portions 21c to 26c of the light-shielding blade members 21 to 26 are slidably supported by the respective cam groove portions 28b to 28g of the cam member 28.

In the light amount adjustment apparatus, the light-shielding blade members 21 to 26 are spaced equidistantly in a circumferential direction around the optical axis. The light-shielding blade members 21 to 26 are so configured as to be capable of controlling the aperture opening amount by changing states of overlapping of the light-shielding blade base portions 21a to 26a, and the greater the amount of overlapping, the smaller the aperture opening amount.

In the light amount adjustment apparatus, by controlling the operation of the stepping motor 210, the aperture opening diameter is changed to adjust the amount of light.

Thus, in the light amount adjustment apparatus, when a control unit, not shown, drives the stepping motor 210, the pinion gear 211 rotates. In response to the rotation of the pinion gear 211, the rotary member 27 rotates to rotatively drive the first shaft portions 21b to 26b of the light-shielding blade members 21 to 26 about the optical axis.

With this operation, the second shaft portions 21c to 26c are moved along the cam groove portions 28b to 28g of the cam member 28. This operation causes the second shaft portions 21c to 26c to relatively rotate about the shaft hole portions 27b to 27g of the rotary member 27, whereby the amount of entry into the aperture 28a is changed.

The six light-shielding blade members 21 to 26 operate to change the aperture opening diameter at the same time in synchronization with the rotary member 27. In this operation in which the aperture opening diameter is changed, the aperture opening diameter is continuously changed from a retracted state in which the light-shielding blade members 21 to 26 are retracted from the aperture 28a of the cam member 28 to an inserted state in which the light-shielding blade members 21 to 26 are inserted into the aperture 28a of the cam member 28. In the above described way, in the light amount adjustment apparatus, by controlling the operation of the stepping motor 210, the aperture opening diameter is changed to adjust the amount of light.

Next, a method of manufacturing the light-shielding blade members according to the second embodiment will be described.

A base material for the blade base portions 21a to 26a of the light-shielding blade members 21 to 26 is a resin material such as polyethylene terephthalate, and they are formed by punching a thin flat plate material in which an additive such as carbon black is mixed as appropriate so as to make the blade base portions 21a to 26a light-shielding.

For the thin flat plate materials for the blade base portions 21a to 26a formed by punching, blasting as post-processing is performed on an end portion 21d of the blade base portion which is a part forming an aperture diameter.

It should be noted that blasting performed here is a process in which nonmetallic particles or metallic particles are caused to collide with the light-shielding blade member end portion 21d as a material to be cut so that the light-shielding blade member end portion 21d can be surface-roughened or lightly cut. Particularly in the present embodiment, blasting is performed using wet blasting. Wet blasting is a machining method that surface roughening or light cutting is performed by projecting nonmetallic particles or metallic particles using spray droplets formed by applying the pressure of compressed air or the like to a liquid such as water.

To perform blasting as post-processing on the light-shielding blade member end portion 21d of the light-shielding blade members 21 to 26, first, the blade base portion 21a as a material to be cut is fixed on a plane of a fixing jig 212 such that a beam incidence plane of the light-shielding blade member 21 is faced up as shown in FIG. 7. On this occasion, the plane of the fixing jig 212 on which the light-shielding blade member 21 is fixed is exposed outside the light-shielding blade member end portion 21d of the light-shielding blade members 21. As a result, a corner part indicated as a region A in FIG. 7 is formed by a light-shielding blade end face 21e (see FIG. 8) and the plane of the fixing jig 212. Blasting is then performed in which spray droplets containing nonmetallic particles or metallic particles are sprayed obliquely downward in a direction indicated by an arrow B in FIG. 7 at high pressure onto the light-shielding blade member end portion 21d so that the light-shielding blade member end portion 21d can be surface-roughened or lightly cut. Here, the direction indicated by the arrow B is a direction that is tilted at a predetermined angle from a direction perpendicular to the plane of the fixing jig 212 to a direction in which the plane of the fixing jig 212 is exposed.

Here, because the blade base portion 21a is formed by punching, a burr 21h formed due to a shearing force on one side of a punching end face in a part of the light-shielding blade member end portion 21d which corresponds to the inner periphery of the aperture through which light can pass. For this reason, the blade base portion 21a is fixed on the fixing jib 212 in such an orientation that the burr 21h in the part of the light-shielding blade member end portion 21d which corresponds to the inner periphery of the aperture through which light can pass is cut away.

By performing blasting in this state using wet blasting, the light-shielding blade member end portion 21d of the light-shielding blade members 21 to 26 is formed with an oblique portion 21f that has the surface thereof roughened and is tilted relative to the optical axis as shown in FIG. 8B by machining. Also, the burr 21h is cut away. Thus, when the blade base portions 21a to 26a are formed with the oblique portion 21f and the light-shielding end face 21g by blasting, the burrs 21h to 26h formed during punching can be removed at the same time.

In the case where the light-shielding blade member end portion 21d is machined into the oblique portion 21f having the surface thereof roughened and tilted relative to the optical axis in the above described way, undesired light can be prevented from being reflected and causing ghosts, flare, and so on.

Moreover, the region A shown in FIG. 7 is a region that is not subjected to blasting during machining by blasting using wet blasting. This is because in the corner part formed by the end face 21e of the blade base portion and the plane of the fixing jib 212, the flow rate of spray droplets projecting abrasives such as nonmetallic particles and metallic particles is low, and the power of machining on the light-shielding blade end face 21e is low.

This region that is not subjected to blasting is the corner part formed by the light-shielding blade end face 21e and the plane of the fixing jig 212. This region is not subjected to blasting because the flow rate of spray droplets projecting nonmetallic particles or metallic particles is low, and the power of machining on the light-shielding blade end face 21e is low.

After undergoing blasting shown in FIG. 7, the light-shielding blade member end portion 21d has a form partially cut away by blasting as shown in FIG. 8B. Specifically, in the part of the light-shielding blade member end portion 21d, the oblique portion 21f is newly formed in a range between the plane of the blade base portion 21a and the light-shielding blade end face 21e. At the same time, in the part of the light-shielding blade member end portion 21d, the light-shielding blade end face 21g that is a part of the light-shielding blade end face 21e is newly formed.

The light-shielding blade end face 21e has a shape formed with low machining power resulting from a low flow rate of spray droplets in the region A in FIG. 7. The newly formed light-shielding blade end face 21g substantially maintains the outside dimensions of the blade base portion 21a. Namely, in the case where blasting is performed as shown in FIG. 7, a desired shape shown in FIG. 8B can be obtained without loss of the dimensional accuracy of the light-shielding blade end face 21e.

Moreover, blasting has a surface roughing effect. Thus, both the oblique portion 21f and the newly formed light-shielding blade end face 21g have the surfaces thereof roughened as distinct from the properties of the light-shielding blade end face 21e that was a smooth surface before blasting. It should be noted that the light-shielding blade end face 21e before blasting is also a plane that, when assembled as it is into the light amount adjustment apparatus, causes ghosts, flare, and so on because it is parallel with the optical axis and acts as a reflection surface for undesired light.

Then, the blade base portion 21a becomes the light-shielding blade member 21 after undergoing a step in which the first shaft portion 21b and the second shaft portion 21c are formed.

Moreover, the light-shielding blade members 22 to 26 are formed similarly to the above described light-shielding blade member 21 and incorporated into the light amount adjustment apparatus according to the second embodiment.

In the light amount adjustment apparatus, the blade base portion end face 21g parallel with the optical axis and located in the aperture formed by the light-shielding blade members 21 to 26 subjected to blasting is relatively small and has the surface thereof roughened. Namely, the blade base portion end face 21g is smaller than the blade base portion end face 21e as a smooth surface before machining, and has the surface thereof roughened. For this reason, in the light adjustment apparatus, undesired reflection on the light-shielding blade end faces which could cause degradation in image quality such as flare and ghosts can be reduced.

Also, the burrs 21h to 26h formed when the blade base portions 21a to 26a are formed by punching can also be processed at the same time by blasting.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-206845 filed Sep. 8, 2009, which is hereby incorporated by reference herein in its entirety.

What is claimed is:

1. A light amount adjustment apparatus comprising:
    a driving source; and
    a plurality of light-shielding blade members to which a driving force of said driving source is transmitted to change an aperture diameter,
    wherein said light-shielding blade members are formed by injection molding of a light-shielding resin material, and
    wherein by performing blasting on an end face of said light-shielding blade member in a part that forms the aperture diameter, an aperture end face whose surface is roughened while substantially maintaining outside dimensions of said light-shielding blade member is formed, and an oblique portion tilted relative to the aperture end face is formed.

2. A light amount adjustment apparatus comprising:
    a driving source; and
    a plurality of light-shielding blade members to which a driving force of said driving source is transmitted to change an aperture diameter,
    wherein said light-shielding blade members are formed by punching a light-shielding plate material, and
    wherein by performing blasting on an end face of said light-shielding blade member in a part that forms the aperture diameter, an aperture end face whose surface is roughened while substantially maintaining outside dimensions of said light-shielding blade member is formed, and an oblique portion tilted relative to the aperture end face is formed.

3. A method of manufacturing a light-shielding blade member, comprising:
    a step of performing injection molding of a light-shielding resin material;
    a step of fixing, on a fixing member, a light-shielding blade member formed by injection molding of the resin material in said injection molding step; and
    a step of performing blasting on an end face of the fixed light-shielding blade member in a part that forms an aperture diameter,
    wherein when fixing, on the fixing member, the light-shielding blade member formed by injection molding, the light-shielding blade member formed by injection molding is fixed on the fixing member such that the fixing member is exposed outside the part of the light-shielding blade member formed by injection molding which forms the aperture diameter.

4. A method of manufacturing a light-shielding blade member according to claim 3,
    wherein when performing blasting, nonmetallic particles or metallic particles are caused to collide from a direction tilted at a predetermined angle from a direction perpendicular to a plane of the fixing member to a direction in which the plane of the fixing member is exposed.

5. A method of manufacturing a light-shielding blade member according to claim 4,
    wherein the blasting comprises wet blasting.

6. A method of manufacturing a light-shielding blade member, comprising:
    a step of punching a light-shielding plate material;
    a step of fixing, on a fixing member, a light-shielding blade member formed by punching the plate material in said pinching step; and
    a step of performing blasting on an end face of a part of the fixed light-shielding blade member which forms an aperture diameter,
    wherein when fixing, on the fixing member, the light-shielding blade member formed by punching, the light-shielding blade member formed by punching is fixed on the fixing member such that the fixing member is exposed outside the part of the light-shielding blade member formed by punching which forms the aperture diameter.

7. A method of manufacturing a light-shielding blade member according to claim 6,
    wherein when performing blasting, nonmetallic particles or metallic particles are caused to collide from a direction tilted at a predetermined angle from a direction perpendicular to a plane of the fixing member to a direction in which the plane of the fixing member is exposed.

8. A method of manufacturing a light-shielding blade member according to claim 7,
    wherein the blasting is blasting using wet blasting.

* * * * *